P. BOUCHER.
PHOTOGRAPHIC EXPOSURE METER.
APPLICATION FILED JUNE 3, 1912.
1,078,482.
Patented Nov. 11, 1913.
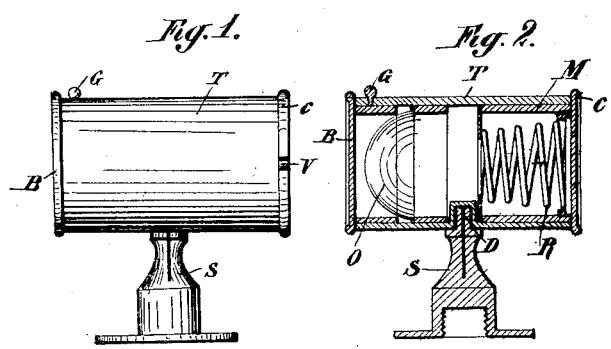
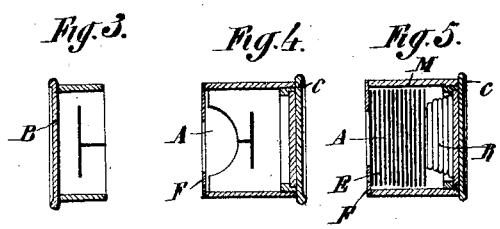
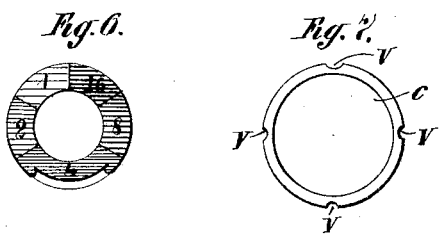
Witnesses:
Georges Faugin
Leon Sciot.
Inventor:
Paul Boucher

UNITED STATES PATENT OFFICE.

PAUL BOUCHER, OF PARIS, FRANCE.

PHOTOGRAPHIC EXPOSURE-METER.

1,078,482.  Specification of Letters Patent.  Patented Nov. 11, 1913.

Application filed June 3, 1912. Serial No. 701,247.

*To all whom it may concern:*

Be it known that I, PAUL BOUCHER, a citizen of the French Republic, residing at Paris, in France, have invented a certain new and useful Photographic Exposure-Meter, of which the following is a specification.

The difficulties of exactly determining the necessary exposure in photography are well known. Particularly in colored photography, if the exposure is not exactly what it ought to be, no results or very unsatisfactory results are obtained. Various apparatus have been suggested such as photometers, etc., but they give merely approximate results difficult to read and sometimes having no relation to the subject to be photographed.

The apparatus forming the subject of this patent, which is in effect a real small photographic apparatus, obviates the drawbacks in question by quickly giving exact indications obtained with the subject to be photographed.

In the accompanying drawing—Figure 1 shows a construction of the apparatus (on an enlarged scale), Fig. 2 a longitudinal section of the same with the magazine empty, Fig. 3 shows the cap seen from the side, Fig. 4 shows the magazine seen from the side, Fig. 5 shows the magazine in section filled with papers, Fig. 6 shows the front face of the magazine and Fig. 7 is the rear face of the same showing notches.

This apparatus comprises a quick exposure object glass O, and a dark chamber constituted by a tube T which forms the body of the apparatus; to this tube is secured outside a sight G, and a plug D carried on a support S.

A rotary magazine frame M is charged with sheets of sensitive paper, the first sheet of which faces the object glass and is arranged in the focus of the latter so that it becomes dark by the action of the rays which it receives through the lens O. The movable support S enables the apparatus to be placed for use either on the stand of the photographic apparatus, or on the apparatus itself, the end of the support being adapted to engage by friction with the sleeve D which forms one piece with the tube T. A cap B for the object glass closes the front of the apparatus.

The magazine M (Figs. 2, 4, 5 and 6) consists of a cylindrical box, the open end of which is closed by means of a cover C which is screwed into its interior. This cover C is wider than the tube T and is provided in the part projecting beyond the tube with four notches V (Fig. 7) arranged in the shape of a cross, the said notches forming sighting devices by alining them with the sight G. In the interior of the said cover is secured a spiral spring R which exercises pressure against the centrally perforated disk F forming the end of the magazine M. The spring is intended to press the disks of sensitive paper with which the magazine is provided, against the centrally perforated end F of the latter.

Around the central opening in the perforated disk forming the end of the magazine are painted tints used for comparison with the darkening of the paper. These tints correspond to those which the sensitive paper takes under the action of the luminous rays received through the object glass. The tints are arranged so that the time of exposure of the sensitive paper increases in a given proportion, for instance double, that is to say that in order to obtain the tint 8, the sensitive paper takes twice as much time as to reach the tint 4, and half the time required to reach the tint 16. The perforation in the end of the magazine is of such size and shape that the sensitive paper disks can be easily withdrawn one at a time, after being exposed, by the aid of a sharp pointed instrument such as a pin, etc., the said disk being then automatically replaced by the next washer pushed by the spring R against the end F.

The apparatus is used in the following manner: At the moment of taking a photograph, the apparatus is placed on the photographic apparatus proper, or on the stand of the latter, the object to be photographed is sighted by making the sighting device, the guide and the object coincide on one and the same line. The object glass is uncovered by removing the cap, and at that moment, an image will be produced on the first disk of sensitive paper (the duration of exposure required for obtaining an image of medium intensity varies from 30 seconds to 8 minutes). The time elapsing from the moment at which the cap has been removed, to the moment when, assuming that the exposure is correct, the magazine M is removed in order to see to which tint the image corresponds, is counted, then, on the table accompanying each apparatus, in front of the number of the tint corresponding to the tint of the image and in front of the diaphragm used, is read the exact time of exposure for the plate used.

The table is made up in columns having a small chart at one end, in which is located the number of tint obtained by any given time of exposure, and when this is determined by simply reading in the same line across from left to right the time necessary to expose the camera plate for the various lens stops is ascertained in another chart made continuous with the one for the trial exposure of the paper.

The image given by the object glass being a photographic image which can show strong contrasts, for instance a very strongly lighted sky and a very dark object in the foreground, an amateur could be in doubt as to how to judge the mean of these two very different tints. In order to avoid the error which may be caused thereby, the magazine M of the apparatus can rotate in the tube T, so that it is sufficient to turn it to about ¼ of a revolution during each quarter of the time of exposure, in order to obtain, instead of the normal image, a blurred image representing a regular surface which enables a comparison with the corresponding tint to be easily made.

What I claim as my invention and desire to secure by Letters Patent is:—

1. In a photographic exposure meter the combination of a tube, a cap located at one end of the tube, an object glass in said tube, a magazine adapted to carry layers of sensitive paper and located at the end of the tube opposite to the cap, a spring within the magazine to press the sensitive paper into operative position, a perforated inner end on the magazine tinted for comparison with the darkened sensitive paper, and a support for the tube.

2. In a photographic exposure meter the combination of a tube, a cap located at one end of the tube, an object glass in said tube, a magazine adapted to carry layers of sensitive paper and rotatable in the end of the tube opposite to the cap, a spring within the magazine to press the sensitive paper into operative position, a perforated inner end on the magazine tinted for comparison with the darkened sensitive paper, and a support for the tube.

3. In a photographic exposure meter the combination of a tube, a sighting projection on the outside of the tube, a cap located at one end of the tube, an object glass in said tube, a magazine adapted to carry layers of sensitive paper and rotatable in the end of the tube opposite to the cap, a spring within the magazine to press the sensitive paper into operative position, a perforated inner end on the magazine tinted for comparison with the darkened sensitive paper, a notched rim on the outer end of the magazine for alining with the sighting projection, and a support for the tube.

In testimony whereof I have signed my name to this specification in the presence of two subscribing witnesses.

PAUL BOUCHER.

Witnesses:
GEORGES FAUGÉR,
LEON SCIOT.

---

Copies of this patent may be obtained for five cents each, by addressing the "Commissioner of Patents, Washington, D. C."